United States Patent [19]

Eastman et al.

[11] Patent Number: 5,208,449
[45] Date of Patent: May 4, 1993

[54] PORTABLE TRANSACTION TERMINAL

[75] Inventors: Jay M. Eastman, Pittsford; John A. Boles, Fishers, both of N.Y.

[73] Assignee: PSC, Inc., Webster, N.Y.

[21] Appl. No.: 756,637

[22] Filed: Sep. 9, 1991

[51] Int. Cl.$^5$ ............................................. G06K 7/10
[52] U.S. Cl. ..................................................... 235/462
[58] Field of Search ......................................... 235/462

[56] References Cited

U.S. PATENT DOCUMENTS

| | | | |
|---|---|---|---|
| 4,758,717 | 7/1988 | Shepard et al. | 235/472 |
| 5,015,831 | 5/1991 | Eastman et al. | 235/462 |
| 5,144,119 | 9/1992 | Chadima, Jr. et al. | 235/462 |

*Primary Examiner*—David P. Porta
*Assistant Examiner*—Don Wong
*Attorney, Agent, or Firm*—Martin LuKacher

[57] ABSTRACT

A headset to be worn around the head of an operator having a head-band, a microphone, a bar code reader, a display, electronics including a microprocessor and speech recognition for translating alphanumeric names and words into data which are to be stored in the memory of the microprocessor and a transceiver for exchanging data with a remotely located modem. Upon a voice activation, messages issued by the microprocessor are visually projected on a display and the reader is initiated.

13 Claims, 2 Drawing Sheets

PORTABLE TRANSACTION TERMINAL

DESCRIPTION

The present invention relates to portable transaction terminals which provide for the entry of data by optical code reading or keying of the characters of the data, and particularly to an improved terminal where data entry operations do not interfere with other operations as may be required to handle products, data with respect to which is to be read or entered, thereby, reducing the time and increasing the efficiency and productivity of inventory management operations.

The invention is especially suitable for providing a portable transaction or data entry terminal which is battery operated and which may be used to gather data concerning products both by key entry of the data and by operation of an optical reader of codes containing the data, all of which are embodied by a headset which is worn by the user so that the data acquisition on entry operations do not interfere with the use of the hands to pick and place products in the course of inventory management operations.

Portable transaction terminals, including bar code scanners and readers and keyboards integrated into the terminal to provide a unitary terminal, are in general use for inventory management and control. These terminals include housing for the optics of the scanner and the electronics associated therewith, computers, keyboards and displays. The form of such terminals vary, but most comprise a trigger operated scanner and a keyboard on the surface of the scanner housing (See U.S. Pat. No. 4,758,717 issued Jul. 19, 1988). Operation of the terminal either to enter data via the keyboard or from manual actuation of the scanner requires operations by the user which are separate, distinct and apart from normal manual operations such as in picking and placing products in racks, in addition the users are called on to pull triggers thousands of times in a work day and to actuate keyboards by pressing buttons. Such repetitive motion can cause stress and has been found to cause physical injury in certain cases, sometimes called carpal motion syndrome.

It is the principal object of this invention to provide an improved portable transaction terminal for the entry of data by code reading and the entry of characters of data without the need for triggers or keys or special manipulations which interfere with the performance of the user of inventory management tasks, such as picking and placing of products.

It is a further object of the present invention to provide an improved portable transaction or data entry terminal where the entry of data and the display of data for prompting and instructing the user and also code scanning facilities are integrated into a headset which is worn on the head of the user and enables the user to carry on normal operations, such as picking and placing of products on shelves or racks.

It is a still further object of the present invention to provide an improved portable transaction terminal which may be implemented in a headset together with facilities for transmitting data entered into the terminal to a remote location or receiving data from remote locations for providing operator prompts and instructions.

Briefly described, a portable transaction terminal embodying the invention which does not require manual keyboard or code reader actuation is embodied in a headset. An optical code reader is carried on the headset for scanning a code when actuated. Voice operated means is provided, also carried by the headset for entering transaction data and for actuating the code reader to scan codes and enter data corresponding to the codes scanned by the reader.

The foregoing and other objects, features and advantages of the invention, as well as a presently preferred embodiment thereof, will become more apparent from the reading of the following description in connection with the accompanying drawings in which.

Figure 1:
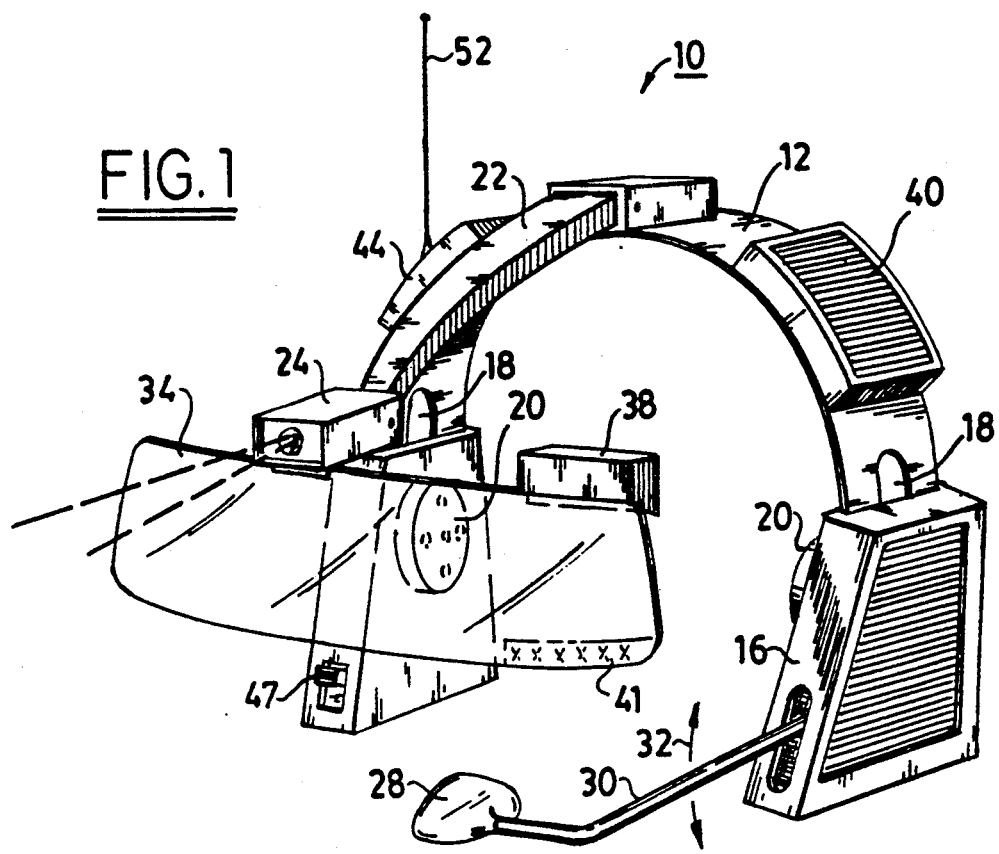
FIG. 1 is a perspective view of a portable transaction terminal embodying the invention.

Referring to the drawings, there is shown a headset 10 made up of a band 12 and side pieces 14 and 16 which are adjustable by being slidable in slots 18 to bring earphones 20 carried in the side pieces adjacent the ears of the wearer and adjusting the band 12 so that it rests comfortably on the head of the user.

Projecting from the middle of the top of the band 10 is an arm 22 having a bar code scanner 24 attached to the forward end thereof. The scanner has an optical output port 24. A beam of light which scans the code extends through the port and scattered light representing the code which is scanned is received through the port. Such a bar code scanner or reader may be of the type which is shown in U.S. Pat. No. 5,015,831 issued May 14, 1991, or U.S. patent application Ser. No. 07-543950 filed Jun. 26, 1990 in the name of J. M. Eastman. Such scanners are presently preferred because of their miniaturized configuration.

Figures 2, 3:
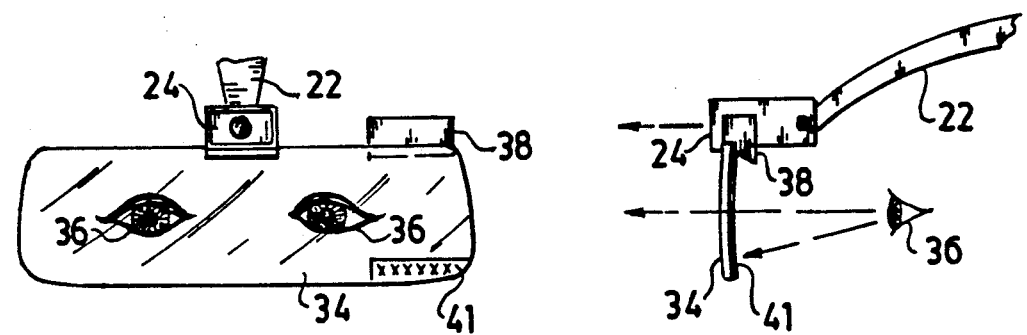
FIG. 2 is a front view showing a screen on which a visual display of the data entered with the terminal or transmitted thereto, as for providing prompts or instructions to the user, maybe displayed.
FIG. 3 is a side view of the portion of the terminal shown in FIG. 2.

A microphone 28 on a boom 30 is adjustably positioned for tilting an inward and outward movement as shown by the arrows 32. In one of the side pieces 16 of the headset, a screen 34 which may be transparent so that the user, whose eyes 36 are shown in FIGS. 2 and 3, can view the code through the screen. The screen mounts a heads up display unit 38 which projects light at a display area 40 on the screen to provide a alphanumeric message which can be viewed by the user.

Figure 4:
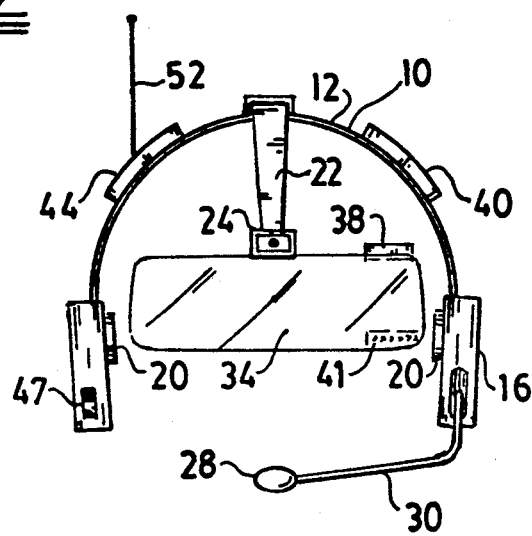
FIG. 4 is a front view of the terminal from which the optical reader and optical display screen has been removed.
Figure 5:
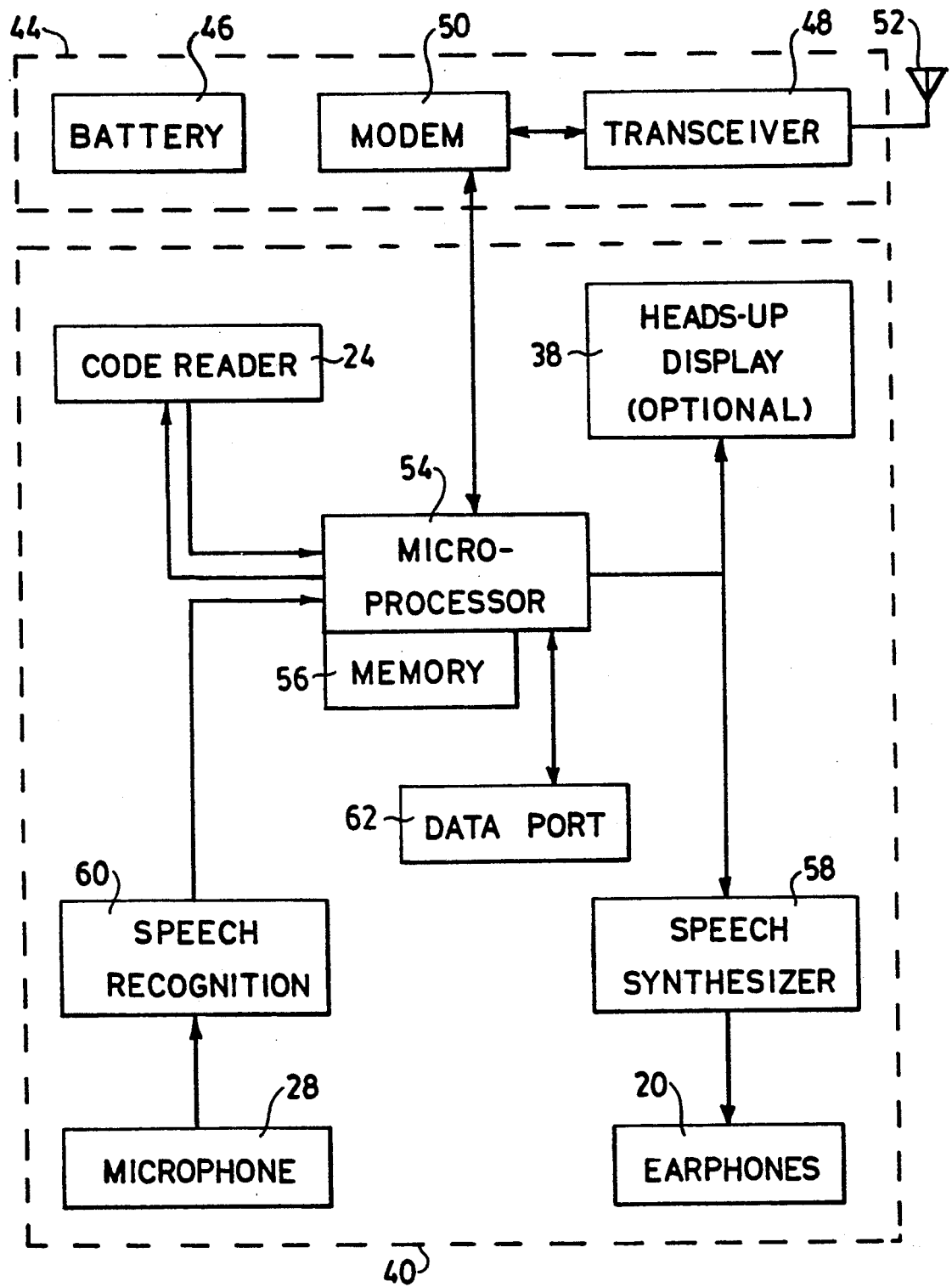
FIG. 5 is a block diagram of the electronics carried on the headset or associated therewith.

Also mounted on the band 10 is the electronics of the terminal. The electronics is shown in FIG. 5. It is located in a housing 40. The housing 40 may contain a battery pack. Preferably, the battery pack is located in the side pieces 16. A switch 47 for connecting the battery to the electronic components of the terminal is also preferably mounted in the side pieces. The switch may be on the side of the housing 40, if desired. Alternatively, the battery pack and circuits for transmitting messages and receiving messages at the headset may be mounted on a unit held on the belt or an armband of the user. Alternatively, this unit 44 (see FIGS. 1, 4, and 5) may be mounted on the band 12 or in one of the side pieces 16. This unit 44 contains the battery 46, which is connected by wiring (not shown in FIG. 5) to the electronic components of the headset.

The unit 44 contains a transceiver 48 and a modem 50. The transceiver is connected to the antenna 52 (see also FIGS. 1 and 4). The transceiver may be a conventional UHF radio transceiver, which receives messages from a transceiver at a remote location by way of a radio link. Alternatively, the transceiver may be adapted to drive an ultrasonic or infrared transducer, then an optical or acoustic link to the remote location is used.

The housing 40 contains a microprocessor 54 which receives the signals from the code reader 24. The microprocessor has a digitizer (an analog to digital converter) therein or associated therewith which translates the signal corresponding to the code scanned by the reader into data when the scanner is actuated. Actuation of the reader is by way of a command from the microprocessor. The input data from the reader 24 is stored in a memory (RAM) 56 associated with the microprocessor. The memory may have a read only portion (ROM), which stores the operating and application program of the microprocessor and preset messages which are displayed either visually, via the heads up display 38, or audibly, via a speech synthesizer 58, which is connected to the earphones 20.

Commands and the names of characters (letters and digits) are pronounced into the microphone 28 and applied to a speech recognition circuit 60 which translates them into codes which are input to the microprocessor 54 and entered into its memory 56. These commands may be the word "fire" or "read", which are translated into codes corresponding thereto by speech recognition circuits 60. Such circuits may be of the type which are used in other speech recognition applications and may include a microprocessor for digitizing the characters and commands into codes, comparing them with templates and reading out the representative codes for the pronounced characters and command words into the microprocessor.

When the command to fire or read is detected, the microprocessor provides an output to actuate the code reader 24. The reader then scans the code and data representing the numerals of the code are entered into memory. Another command may be to read out successive preset messages (constituting a menu of instructions for the operator) or messages received via the transceiver 48 and modem 50 by the microprocessor and stored in the memory 56. Then the heads up display 38, if used, or the speech synthesizer or earphones are provided the codes and corresponding audible or visual messages are produced. In the case of the heads up display, they are displayed on the screen 34.

It is desirable that all codes read by the reader 24 and all data (characters) input by pronouncements into the microphone be displayed either optically or audibly so that the user can verify correct input of the codes. The codes and data which are entered into the memory may be read out via a data port 62 of the microprocessor or via the modem 50 and transceiver 48.

It will be apparent from the foregoing description that the user enters data and operates the optical code reader without the use of his or her hands, leaving the hands free for picking and placing products and other normal operations. Variations and modifications in the herein described system, within the scope of the invention, will undoubtedly suggest themselves to those skilled in the art. Accordingly, the foregoing description should be taken as illustrative and not in a limiting sense.

We claim:

1. A portable transaction terminal which does not require manual keyboard or code reader actuation, said terminal comprising a headset, an optical code reader on said headset for scanning a code symbol when actuated, and voice operated means for entering transaction data and for actuating said code reader to enter data corresponding to the codes scanned by said reader also carried on said headset.

2. Terminal according to claim 1 further comprising means for transmitting messages for the user of said terminal to said headset from a remote location.

3. The terminal according to claim 1 wherein said headset has a band worn about the head of the user extending around the top of the head, said code reader being attached to said band and having a port through which a beam of light which scans said code projects.

4. The terminal according to claim 3 further comprising, an arm attached to said band where it extends around the top of the head, a transparent screen depending from said arm across a field of view of the user, and means for displaying the code read by said reader and transaction data on said screen for viewing by the user.

5. The terminal according to claim 4 further comprising means on said headset for applying messages transmitted from a remote location to said displaying means.

6. The terminal according to claim 3 wherein said code reader is attached to said band by being mounted on said arm.

7. The terminal according to claim 1 wherein said voice operated means comprises a microprocessor, a microphone carried by said headset, means for recognizing sounds pronounced by the user and received by said microphone for applying codes corresponding thereto to said microprocessor, means for applying electrical signals corresponding to said codes scanned by said code reader to said microprocessor, means for applying signals from said microprocessor to said code reader for actuating said code reader when a certain one of said codes is applied to said microprocessor, and memory means associated with said microprocessor for storing data corresponding to said codes.

8. The terminal according to claim 7 further comprising means operated by said microprocessor for translating such stored codes into messages for the user of said headset.

9. The terminal according to claim 8 wherein said message translating means comprises at least one earphone on said headset disposed in the vicinity of an ear of the user when wearing the headset, speech synthesizer means connected to said earphone, and means for applying said codes entered into said memory means to said speech synthesizer means via said microprocessor.

10. The terminal according to claim 9 wherein said message translating means comprises optical display means including a screen disposed in the field of view of the user, and means for applying said codes entered into said memory means to said display means via said microprocessor.

11. The terminal according to claim 9 further comprising means which output said codes entered into said memory means.

12. The terminal according to claim 11 wherein said output providing means comprises means for transmitting said codes to a remote location.

13. The terminal according to claim 12 wherein said transmitting means includes a modem and a transceiver for both transmitting data corresponding to said codes to a remote location and for receiving data from remote locations, said modem being connected to said microprocessor for entry of said received data into said memory means where it is available for application to said display means upon recognition of a code representing a command to display said received data by said recognizing means.

* * * * *